United States Patent [19]
Buehler et al.

[11] Patent Number: 5,173,704
[45] Date of Patent: Dec. 22, 1992

[54] AIR TURBULENCE DETECTION USING BI-STATIC CW DOPPLER RADAR

[75] Inventors: Walter E. Buehler, Issaquah; Clarence D. Lunden, Federal Way; Kosal Svy, Kent, all of Wash.

[73] Assignee: The Boeing Company, Seattle, Wash.

[21] Appl. No.: 771,153

[22] Filed: Oct. 3, 1991

[51] Int. Cl.$^5$ .............................................. G01S 13/95
[52] U.S. Cl. ....................................................... 342/26
[58] Field of Search ...................................... 342/26–28

[56] References Cited

U.S. PATENT DOCUMENTS

| | | | |
|---|---|---|---|
| 3,251,057 | 5/1966 | Buehler et al. | 342/26 |
| 3,491,358 | 1/1970 | Hicks | 342/26 |
| 4,540,978 | 9/1985 | Burns et al. | 342/28 X |
| 4,595,924 | 6/1986 | Gehman | 342/28 |

Primary Examiner—Gilberto Barrón, Jr.
Attorney, Agent, or Firm—Christensen, O'Connor, Johnson & Kindness

[57] ABSTRACT

A bi-static radar system with an autonulling feature. The system may be used to detect clear air turbulence, for example, in the vicinity of the airports, or to provide an electronic fence for moving air-borne targets having low radar cross sections. The receiver comprises signal and nulling antennas, and the signal received by the nulling antenna is electronically adjusted in phase and amplitude to provide autonulling of the background signal received directly from the transmitter.

10 Claims, 5 Drawing Sheets

AIR TURBULENCE DETECTION USING BI-STATIC CW DOPPLER RADAR

FIELD OF THE INVENTION

The present invention relates to the use of radar for detecting air turbulence. The described techniques can also be used to detect small moving airborne targets.

BACKGROUND OF THE INVENTION

It has recently been recognized that air turbulence in the vicinity of airports can pose a serious safety hazard. Such turbulence can be created in a number of ways. For example, the passage of an aircraft through a region of space is known to create helical turbulence behind the wing tips of the aircraft. Another turbulence source is the weather phenomenon known as a "microburst". In a microburst, a column of air descends rapidly towards the ground, and then fans out laterally. Both of these types of turbulence differ from the turbulence caused by thunderstorms and the like, in that they are entirely invisible to the naked eye. For this reason, such sources are often referred to as clear air turbulence.

Several approaches have been proposed and attempted for detecting air turbulence near airports, including those based upon radar, acoustic and optical technology. Many prior approaches rely upon the presence of rain drops, ice crystals, or heavy dust particles in the turbulent air, i.e., such techniques detect particles entrained in the moving air, rather than the moving air itself. Although techniques that rely upon the detection of particles moving in turbulent air can provide warning for many types of hazards, there is a need for a general purpose technique that also works well for clear air turbulence.

SUMMARY OF THE INVENTION

The present invention provides a bi-static radar system that may be used to detect clear air turbulence, such as in the vicinity of airports. The sensitivity of the system also makes it useful for detecting moving airborne targets having low radar cross sections, such as hang gliders, parachutists, and small aircraft. As such, the system may be deployed as an electronic security fence.

In one embodiment, the present invention provides a bi-static radar system for producing information concerning the presence of a target within a common volume of space. The term "target" is used to encompass clear air turbulence, small moving air-borne targets, and other phenomenon that scatter radiation. The system comprises a transmitter for irradiating a transmit pattern that includes the common volume with substantially CW electromagnetic radiation, and a receiver remotely positioned with respect to the transmitter, to receive radiation scattered from the common volume.

The receiver comprises a signal antenna having a first receiving pattern that includes the common volume. The signal antenna receives radiation reflected by the target from within the common volume, to produce a first receiver signal. The first receiver signal includes a background component caused by background radiation transmitted from the transmitter to the signal antenna without being reflected from within the common volume.

The receiver further comprises a nulling antenna in the vicinity of the signal antenna. The nulling antenna has a second receiving pattern directed toward the transmitter, and receives the background radiation from the transmitter to produce a second receiver signal. The first and second receiver signals are coupled to target detection means that produces therefrom information concerning the presence of the target within the common volume. The target detection means includes auto-nulling means for adjusting the relative phases of the first and second receiver signals, such that the background component of the first receiver signal is at least partially cancelled. In a further embodiment, a plurality of bi-static radar systems of the type described above are positioned along a perimeter or boundary, to create an "electronic fence".

DETAILED DESCRIPTION OF THE INVENTION

Figure 1:
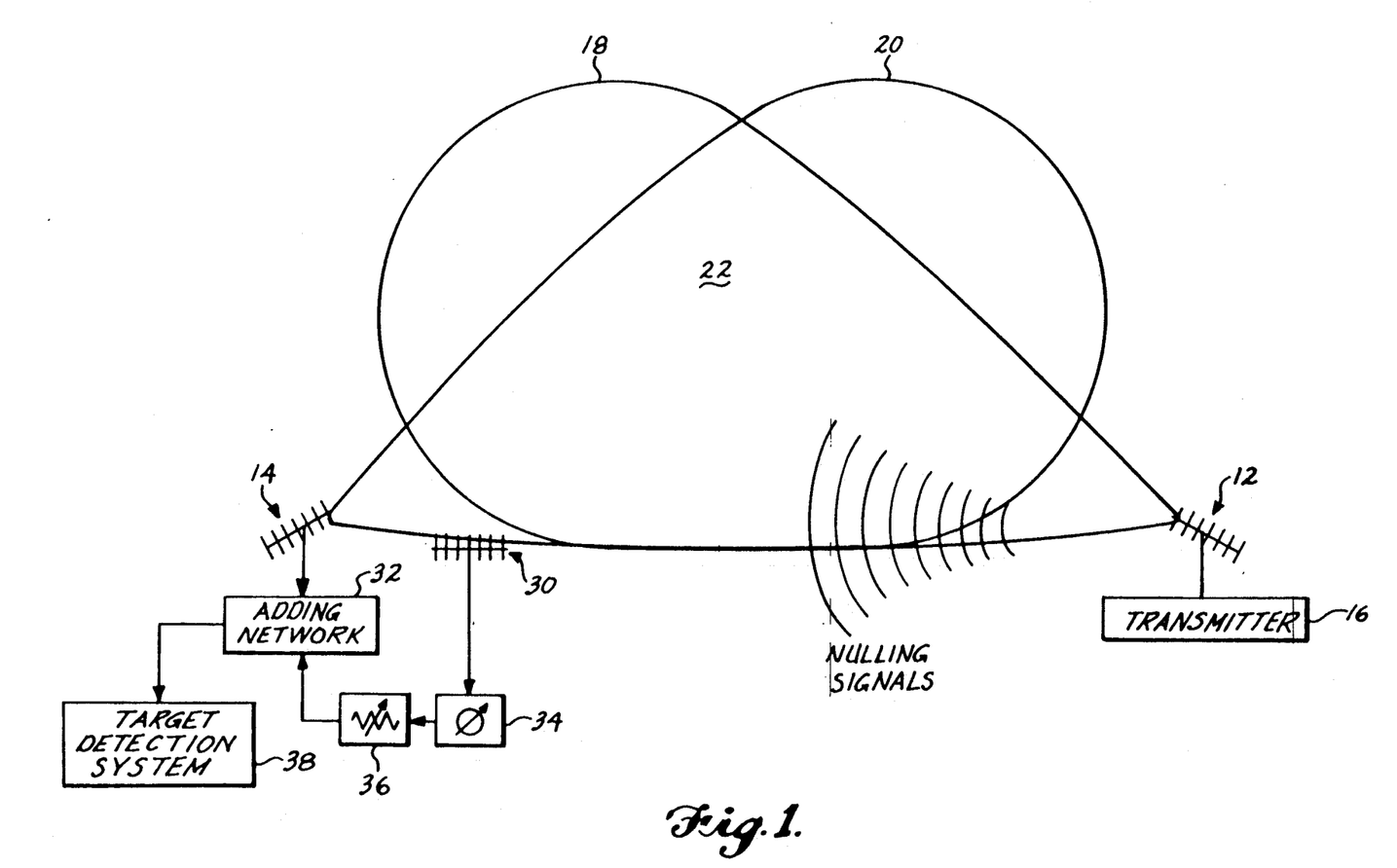
FIG. 1 is a schematic diagram of a bi-static radar system.

FIG. 1 is a schematic diagram illustrating a generalized bi-static radar system, of the type described in U.S. Pat. No. 3,251,057, hereby incorporated by reference. The radar system comprises transmitting antenna 12, and signal antenna 14 that is located some distance from the transmitting antenna. Antenna 12 is energized by transmitter 16, such that it emits CW radio frequency energy within a transmitting pattern 18.

Most conventional radar systems are monostatic, i.e., the receiver and transmitter are located at the same site, and share the same antenna. A bi-static radar system functions on the same principles as a normal monostatic radar, but the transmitter and receiver have separate antennas and are separated by some significant distance. This configuration allows the use of much simpler receiver and transmitter designs, due to the inherent isolation between these units. Another advantage of the bi-static configuration is that the radar signals reflected from a target towards the receiver are generally significantly stronger in a bi-static system than in a monostatic system, due to the fact that most targets scatter more radiation in forward directions, rather than back towards the transmitter. The combination of high isolation from transmitter interference and enhanced target reflectance allows a bi-static system to detect very small cross section targets.

Signal antenna 14 is oriented such that its receiving pattern 20 overlaps transmitting pattern 18 within a common volume 22. In a typical installation, the transmitting and receiving antennas are inclined about 30° with respect to the horizontal. The signal antenna itself, however, is outside of transmitting volume 18. Thus in general, the signal antenna will receive a detectable signal only when a target scatters radiation from within common volume 22 towards the signal antenna. For clear air turbulence, the scattered power will depend on the level of turbulence.

Despite the fact that signal antenna 14 is located outside of pattern 18, the signal antenna will nevertheless pick up some of the signal transmitted by transmitting antenna 12. This "background" signal needs to be cancelled, so that it doesn't falsely indicate the presence of a target with the common volume. To cancel this background signal, the radar system includes a nulling antenna 30 located in the vicinity of the signal antenna. The nulling antenna 30 is directed towards the transmitting antenna, so that it detects the background signal, but little if any of the radiation scattered from within the common volume. The signal from the nulling antenna passes through the variable phase shifter 34 and variable attenuator 36, and is then combined with the signal from receiving antenna 14 in adding network 32. The output of the adding network is coupled to target detection system 38 for further processing as described below.

When there is no target in common volume 22, the phase and amplitude of the signal received by the nulling antenna are manually adjusted, using phase shifter 34 and attenuator 36, such that the resulting output of variable attenuator 36 exactly cancels the background signal received by signal antenna 14. Under these circumstances, there is no output from the adding network, and the system is nulled and ready to detect targets within the common volume. This nulling arrangement is required because in general, radar reflections from clear air turbulence are very weak, and might otherwise be overwhelmed by the background signal transmitted from the transmitting antenna to the signal antenna.

Figure 2:
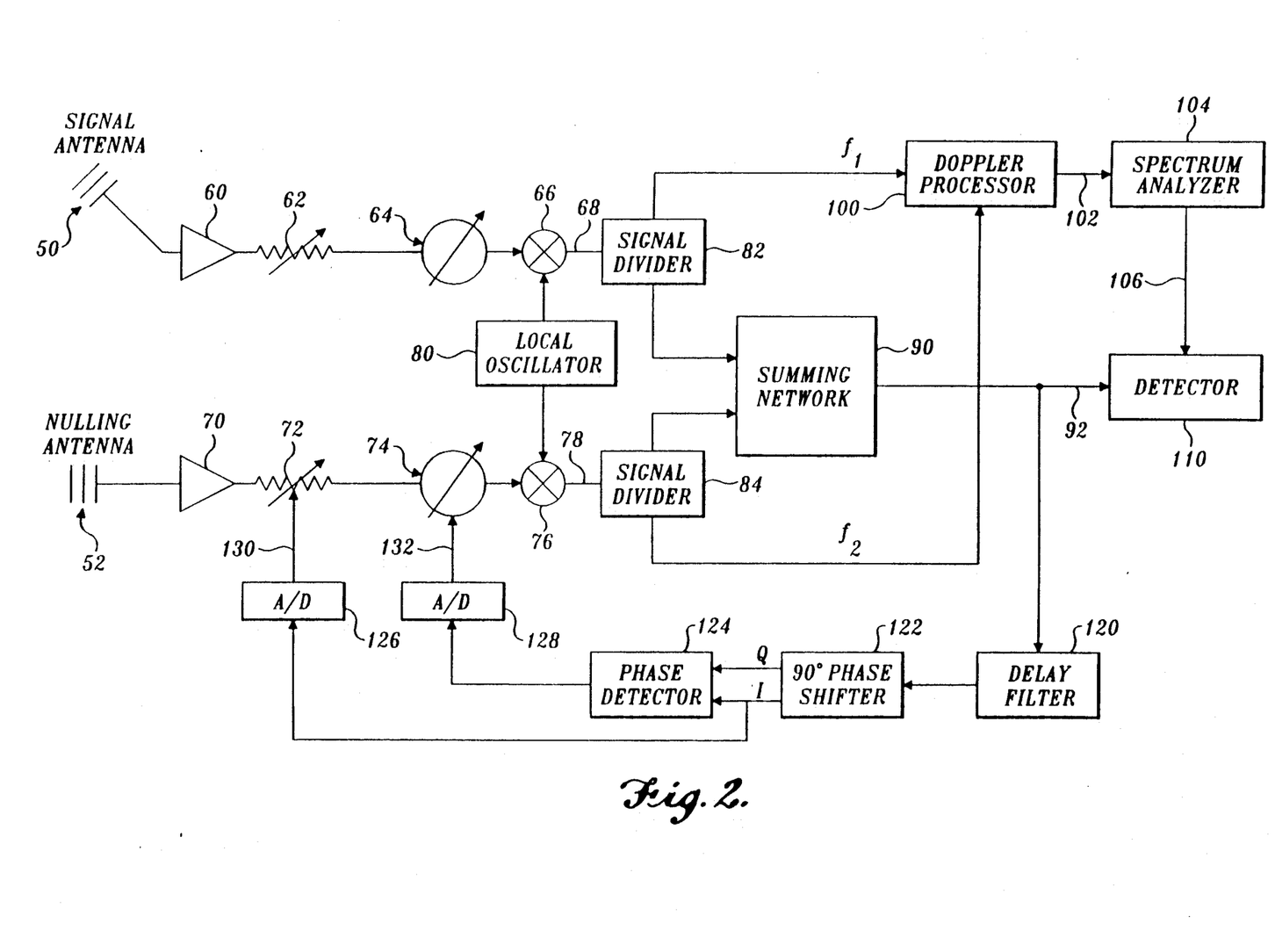
FIG. 2 is a block diagram of a preferred embodiment of the radar system of the present invention.

FIG. 2 represents a block diagram of a first preferred embodiment of the radar system of the present invention. The system comprises signal antenna 50 and nulling antenna 52 that correspond to signal antenna 14 and nulling antenna 30 in FIG. 1. The system also comprises a transmitter and transmitting antenna (not shown) analogous to the corresponding components in the system of FIG. 1. Signal antenna 50 produces a target signal that is amplified by amplifier 60, and then adjusted in amplitude and phase by variable attenuator 62 and phase trimmer 64. The nulling signal produced by nulling antenna 52 similarly passes through amplifier 70, variable attenuator 72 and phase trimmer 74. Variable attenuator 72 and phase trimmer 74 are electronically controlled by control signals 130 and 132 respectively, as further described below. In contrast, attenuator 62 and phase trimmer 64 may be manually controlled devices, because they will require adjustment only rarely during system operation.

The target and nulling signals produced by phase trimmers 64 and 74 are next down-converted by mixers 66 and 76, using local oscillator 80. Down conversion of the target and nulling signals is preferred, because it significantly simplifies the detection of frequency shifts due to moving targets. The resulting IF (intermediate frequencies) signals 68 and 78 are then input to signal dividers 82 and 84, respectively. Portions of the IF signals are coupled by the signal dividers to summing network 90, while the remaining portions of the IF signals are coupled to Doppler processor 100.

The Doppler processor produces a Doppler signal 102 that indicates the presence of frequency-shifted components of the target signal. In the illustrated preferred embodiment, the Doppler processor produces the Doppler signal by determining the difference between the frequency ($f_1$) of the target signal from signal divider 82 and the frequency ($f_2$) of the nulling signal produced by signal divider 84. The Doppler or difference signal is coupled to spectrum analyzer 104. The spectrum analyzer determines the frequency components present in the Doppler signal, and produces a velocity signal 106 that is forwarded to detector 110. The output of summing network 90 is an amplitude signal on line 92 that represents the size of the target (as opposed to its velocity). Amplitude signal 92 is also forwarded to detector 110.

Detector 110 analyzes the velocity and amplitude signals, and determines whether or not a target is present. The way that this determination is made depends upon the particular application of the radar system. For detecting clear air turbulence, a basic problem is to distinguish between turbulence and solid moving targets such as aircraft. Techniques for providing such discrimination are known in the art. For example, one approch is to analyze the velocity signal to detect the presence of both positively and negatively shifted frequencies above a given threshold. A target such as an aircraft within the common volume will in general produce only a single Doppler shift, positive or negative, depending upon the direction of flight of the aircraft with respect to the receiver. Turbulence, on the other hand, will generally produce both positively and negatively shifted Doppler components.

To provide for autonulling, amplitude signal 92 is passed through delay filter 120, and then input to 90° phase shifter produces I and Q (in-phase and quadrature) signals that are input to phase detector 124. The in-phase signal is also input to analog-to-digital converter (A/D)126. A/D 126 produces control signal 130 for controlling variable attenuator 72. The output of phase detector 124 is input to A/D 128, and A/D 128 produces control signal 132 for controlling variable phase trimmer 74.

In operation, first assume that there is no target within the common volume. Under these circumstances, both the signal and nulling antennas receive portions of the background signal transmitted directly from the transmitting antenna. After down conversion, the signals are combined by summing network 90, and the resulting amplitude signal 92 is fed back to variable attenuator 72 and phase trimmer 74. These components adjust the amplitude and phase of the signal received by the nulling antenna, until it exactly cancels the signal received by the signal antenna, at which time summing network 90 produces a zero output. Since the two signals have the same frequency, the output of the Doppler processor 102 (equal to $f_1-f_2$) is also zero.

If a moving target now enters the common volume, it will a scatter radiation at a Doppler shifted frequency, and this scattered radiation will be picked up by signal antenna 50. Since this target signal is not received by the nulling antenna, it will not be nulled out by the system, and will result in the production of a non-zero amplitude signal 92 proportional to the strength of the scattered radiation. The Doppler frequency shift will be preserved through the down-conversion stage, and will result in a shift of frequency $f_1$ input to Doppler processor 102. However, signal $f_2$ will not be shifted in frequency, and as a result, the output of the spectrum analyzer (velocity signal 106) will represent the Doppler shift frequency of the target.

Delay filter 120 provides a low pass filter, such that relatively rapidly changing signals will not be nulled by the system, and will therefore be detected as targets. On the other hand, relatively slowly changing signals, for example, due to slowly changing weather conditions, will pass through the delay filter, and will be nulled.

Thus, the cut off frequency of the delay filter should be set to provide an appropriate velocity cut off for targets to be detected by a given application of the system.

Figure 3:
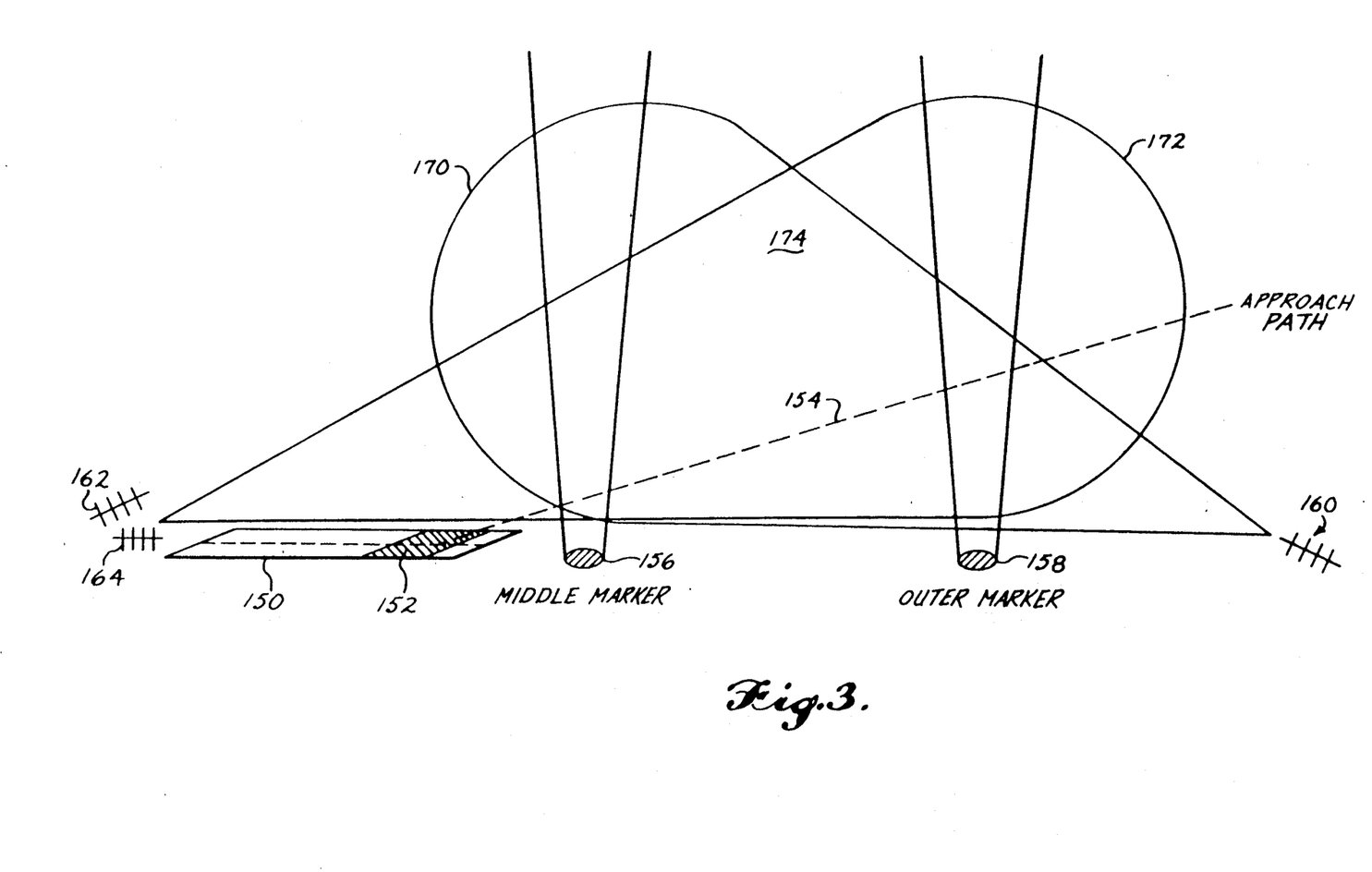
FIG. 3 is a schematic side view showing a bi-static radar system deployed in a flight path at an airport.
Figure 4:
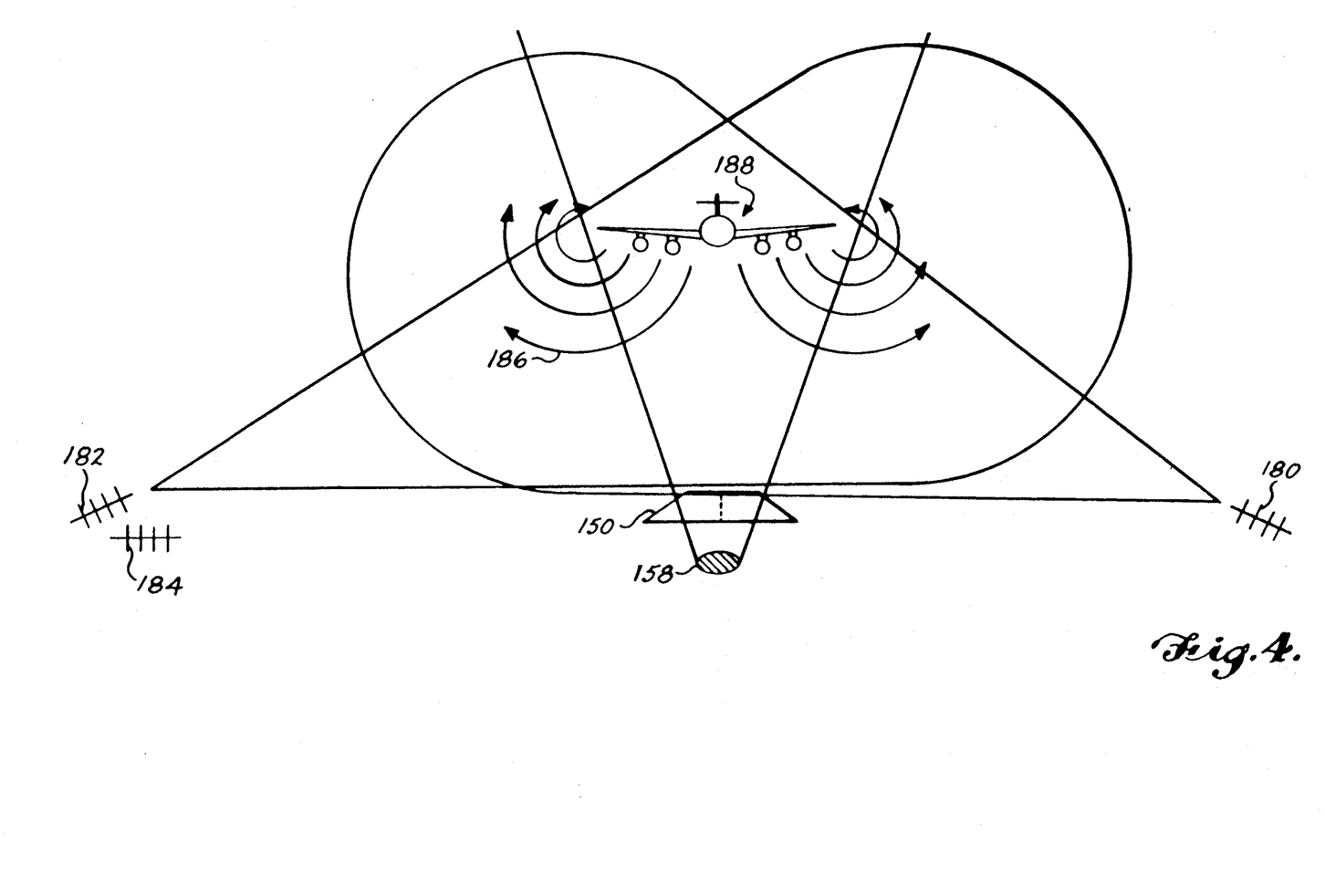
FIG. 4 is a schematic end view showing a bi-static radar system deployed in a flight path at an airport.

FIGS. 3 and 4 illustrate two deployments of the systems shown in FIG. 2 for detecting clear air turbulence in the vicinity of airports. The airport facilities comprise runway 150 that includes touchdown zone 152, approach path 154, and middle and outer markers 156 and 158, respectively. In the arrangement shown in FIG. 3, transmitting antenna 160 is positioned in line with runway 150, beyond outer marker 158, while receiving antenna 162 and nulling antenna 164 are positioned at the far end of the runway. The resulting antenna patterns 170 and 172 thereby produce a common volume 174 that includes the last several miles of approach path 154.

FIG. 4 illustrates an alternate embodiment, wherein transmitting antenna 180 is positioned to one side of the approach path, while receiving antenna 182 and nulling antenna 184 are positioned on the opposite side of the approach path. This deployment has the advantage of being better positioned to detect circular air movements 186 that are known to be produced by the wings of an approaching aircraft 188, i.e., the deployment of FIG. 4 will detect movement normal to the flight path, while the arrangement of FIG. 3 detects movement along the flight path. The arrangements shown in FIG. 3 and 4 could of course both be used at a given airport.

Figure 5:
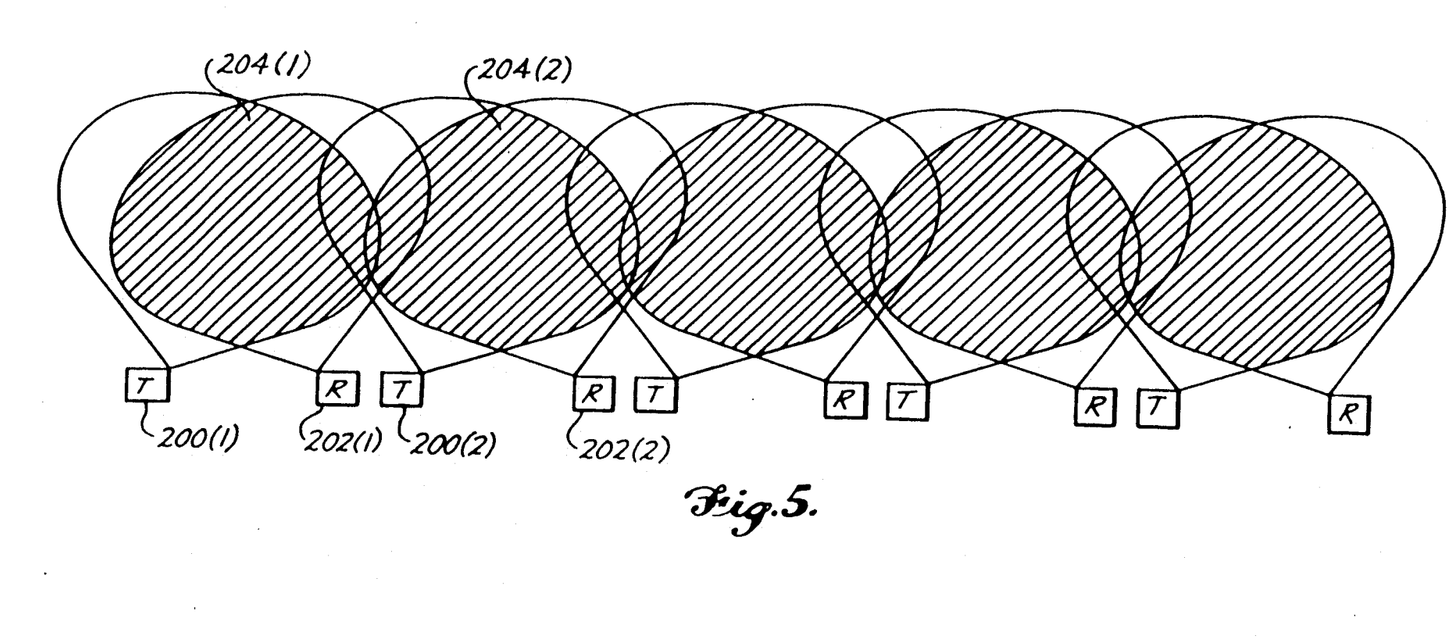
FIG. 5 is a schematic view showing a plurality of bi-static radar systems deployed as an electronic fence.

The system described above is capable of detecting not only refractive index changes caused by air turbulence, but of also low radar cross section, moving airborne targets such as parachutists, hang gliders, and small aircraft. Such detection is possible because of the very high sensitivity of an autonulled, bi-static radar system. FIG. 5 illustrates an arrangement for using the radar system of the present invention to provide an "electronic fence", to protect a military base or other area that must be secured. The system comprises a plurality of transmitters (T) 200(1), 200(2), . . . , and a corresponding plurality of receivers (R) 202(1), 202(2), . . . , each receiver comprising signal and nulling antennas, and associated electronics, as indicated for example in FIG. 2. Each transmitter/receiver pair is oriented substantially as shown in FIG. 1, such that it is capable of detecting targets within a common volume 204. In addition, the transmitters and receivers are positioned such that common volumes 204 collectively cover a continuous region of space along a perimeter or boundary, so that targets attempting to cross the perimeter will be detected by at least one of the transmitter/receiver pairs. To prevent mutual interference between common volume frequencies 204(1), 204(2), etc., each frequency is shifted by an amount sufficient to reject neighboring frequency signals. Because of the CW signal format, it is easy to provide adjacent channel isolation by employing narrow bandpass filters in each receive channel. These filters can be part of amplifiers 60 and 70 (FIG. 2) and are commercially available shelf items.

While the preferred embodiments of the invention have been illustrated and described, variations will be apparent to those skilled in the art. Accordingly, the scope of the invention is to be determined by reference to the following claims.

The embodiments of the invention in which an exclusive property or privilege is claimed are defined as follows:

1. A bi-static radar system for producing information concerning the presence of a target within a common volume of space, the system comprising a transmitter for irradiating a transmit pattern that includes the common volume with substantially CW electromagnetic radiation, and a receiver remotely located with respect to the transmitter, the receiver comprising:

a signal antenna having a first receiving pattern that includes the common volume, and means for receiving radiation reflected by the target from within the common volume to produce a first receiver signal, the first receiver signal including a background component caused by background radiation transmitted from the transmitter to the signal antenna without being reflected from within the common volume;

a nulling antenna in the vicinity of the signal antenna, the nulling antenna having a second receiving pattern directed towards the transmitter and means for receiving said background radiation from the transmitter to produce a second receiver signal; and target detection means comprising means for receiving the first and second receiver signals and for producing therefrom said information concerning the presence of the target within the common volume, the target detection means including autonulling means for modifying the first receiver signal, based upon the second receiver signal, such that the background component of the first receiver signal is at least partially cancelled.

2. The system of claim 1, wherein the target detection means comprises Doppler processing means for producing a Doppler signal indicating the presence of frequency shifted components of the first receiver signal, and spectrum analysis means for analyzing the Doppler signal to derive information concerning the velocity of the target.

3. The system of claim 2, wherein the Doppler processing means produces the Doppler signal by producing a difference signal having a component at a frequency equal to the frequency difference between the first and second receiver signals.

4. The system of claim 3, wherein the target comprises air turbulence, and wherein the target detection means further comprises means connected to receive the Doppler signal and to detect the presence of both positively shifted and negatively shifted components therein, and to produce an output indicating the presence of air turbulence when said positively and negatively shifted components exceed predetermined thresholds.

5. The system of claim 1, further comprising means for converting the first and second receiver signals into corresponding first and second intermediate frequency signals, and means for producing therefrom said information concerning the presence of the target within the common volume.

6. The system of claim 1, wherein the autonulling means comprises a summing network for combining the first and second receiver signals, and wherein the autonulling means modifies the first receiver signal based upon the second receiver signal by adjusting the relative phases of the first and second receiver signals prior to the combination of the first and second receiver signals in the summing network.

7. The system of claim 6, wherein the autonulling means comprises filter means for causing the autonulling means to adjust the relative phases only of frequency components of the first and second receiver signals that are below a selected threshold frequency.

8. The system of claim 6, wherein the autonulling means includes means for adjusting the relative phases and amplitudes of the first and second receiver signals such that the background component of the first receiver signal is at least partially cancelled.

9. A system for producing information concerning the presence of a target crossing a boundary, the system comprising a plurality of bi-static radar systems, each radar system being arranged to produce information concerning the presence of the target within a common volume of space, each radar system comprising a transmitter for radiating a transmit pattern that includes the common volume with substantially CW electromagnetic radiation, and a receiver remotely located with respect to the transmitter, the receiver comprising:

a signal antenna having a first receiving pattern that includes the common volume, and means for receiving radiation reflected by the target from within the common volume to produce a first receiver signal, the first receiver signal including a background component caused by background radiation transmitted from the transmitter to the signal antenna without being reflected from within the common volume;

a nulling antenna in the vicinity of the signal antenna, the nulling antenna having a second receiving pattern directed towards the transmitter and means for receiving said background radiation from the transmitter to produce a second receiver signal;

target detection means comprising means for receiving the first and second receiver signals and for producing therefrom said information concerning the presence of the target within the common volume, the target detection means including autonulling means for modifying the first receiver signal, based upon the second receiver signal, such that the background component of the first receiver signal is at least partially cancelled; and the bi-static radar systems being positioned such that the common volumes are located along said boundary.

10. The system of claim 1, and further comprising means, coupled to the signal and nulling antennas, for amplifying the first and second receiver signals.

* * * * *

UNITED STATES PATENT AND TRADEMARK OFFICE
CERTIFICATE OF CORRECTION

PATENT NO. : 5,173,704  
DATED : December 22, 1992  
INVENTOR(S) : W.E. Buehler, et al.

Page 1 of 2

It is certified that error appears in the above-indentified patent and that said Letters Patent is hereby corrected as shown below:

On the title page, item (56) References Cited: Insert the following references after line 2.

--Re. 33,152 1/1990 Atlas--
--2,639,422 5/1953 Harris--
--3,373,428 3/1968 Atlas--
--3,671,927 6/1972 Proudian et al.--
--3,735,333 5/1973 Balser et al.
--4,219,887 8/1980 MacCready, Jr.--
--4,359,640 11/1982 Geiger--
--4,628,318 12/1986 Alitz--
--4,712,108 12/1987 Schwab--
--4,728,952 3/1988 Residois--
--4,831,874 5/1989 Daubin et al.--

UNITED STATES PATENT AND TRADEMARK OFFICE
CERTIFICATE OF CORRECTION

PATENT NO. : 5,173,704
DATED : December 22, 1992
INVENTOR(S) : W.E. Buehler, et al.

It is certified that error appears in the above-indentified patent and that said Letters Patent is hereby corrected as shown below:

```
Column 4, line 16, "approch" should read --approach--
Column 4, line 27, after "shifter" insert --122. The Phase shifter--
Column 4, line 30, "(A/D)126" should read --(A/D) 126--
Column 5, lines 4-5, "sys-tems" should read --system--
Column 5, line 31, after "also" insert --detecting of--
```

Signed and Sealed this

Ninth Day of November, 1993

Attest:

BRUCE LEHMAN

Attesting Officer

Commissioner of Patents and Trademarks